(12) United States Patent
Schubert et al.

(10) Patent No.: US 8,529,130 B2
(45) Date of Patent: Sep. 10, 2013

(54) AEROSTATIC BEARING ARRANGEMENT AND ASSOCIATED ELECTROSTATIC PRELOADING UNIT, PARTICULARLY FOR VACUUM APPLICATION

(75) Inventors: Gerhard Schubert, Jena (DE);
Christian Jackel, Droyssig (DE);
Ulf-Carsten Kirschstein, Jena (DE);
Michael Boehm, Jena (DE); René Bauer, Jena (DE); Gerd Harnisch, Jena (DE); Thomas Peschel, Jena (DE);
Stefan Risse, Jena (DE); Christoph Schenk, Jena (DE)

(73) Assignee: Vistec Electron Beam GmbH, Jena (DE)

( * ) Notice: Subject to any disclaimer, the term of this patent is extended or adjusted under 35 U.S.C. 154(b) by 487 days.

(21) Appl. No.: 12/553,340

(22) Filed: Sep. 3, 2009

(65) Prior Publication Data

US 2010/0061667 A1    Mar. 11, 2010

(30) Foreign Application Priority Data

Sep. 9, 2008   (DE) .......................... 10 2008 046 636

(51) Int. Cl.
*F16C 17/00*   (2006.01)
*F16C 32/06*   (2006.01)

(52) U.S. Cl.
USPC ................................. 384/9; 384/12

(58) Field of Classification Search
USPC ........................... 384/9, 12, 15, 16
See application file for complete search history.

(56) References Cited

U.S. PATENT DOCUMENTS

| | | | | |
|---|---|---|---|---|
| 3,098,679 A * | 7/1963 | De Boice | ......................... | 384/91 |
| 3,338,644 A * | 8/1967 | Atkinson et al. | ............. | 310/90.5 |
| 4,749,283 A | 6/1988 | Yokomatsu et al. | | |
| 5,228,358 A * | 7/1993 | Sakino et al. | .............. | 74/479.01 |
| 5,345,127 A * | 9/1994 | New | ............................. | 310/90.5 |
| 5,839,324 A | 11/1998 | Hara | | |
| 6,158,298 A * | 12/2000 | Hara | ......................... | 74/490.09 |
| 6,373,156 B2 * | 4/2002 | Suzuki et al. | ............... | 310/68 B |
| 6,590,748 B2 * | 7/2003 | Murphy et al. | ............ | 360/294.4 |
| 6,864,488 B2 * | 3/2005 | Muraki | .................... | 250/442.11 |
| 7,207,720 B2 | 4/2007 | Sai et al. | | |
| 7,548,387 B2 | 6/2009 | Rassel et al. | | |

FOREIGN PATENT DOCUMENTS

| | | |
|---|---|---|
| CA | 961958 | 1/1975 |
| DE | 2160850 A1 | 6/1973 |
| EP | 1235115 A2 | 8/2002 |
| JP | 11294455 A | 10/1999 |

* cited by examiner

*Primary Examiner* — James Pilkington
(74) *Attorney, Agent, or Firm* — Patentbar International P.C.

(57) ABSTRACT

A proposed aerostatic bearing arrangement for moving a device on a base structure, particularly in a vacuum environment, has at least one aerostatic bearing element comprising a bearing body having a load-carrying zone and a suction area. An electrostatic preloading unit having at least one electrode is associated with the at least one aerostatic bearing element, and a voltage can be applied to the electrode in such a way that a force component is generated in direction of the surface normal of the bearing body of the aerostatic bearing element.

17 Claims, 5 Drawing Sheets

AEROSTATIC BEARING ARRANGEMENT AND ASSOCIATED ELECTROSTATIC PRELOADING UNIT, PARTICULARLY FOR VACUUM APPLICATION

RELATED APPLICATIONS

This application claims priority to German Patent Application No. 10 2008 046 636.0, filed on Sep. 9, 2008, which is incorporated herein by reference in its entirety.

FIELD OF THE INVENTION

The invention is directed to an aerostatic bearing arrangement, particularly for vacuum application, according to the preamble of the main claim.

BACKGROUND OF THE INVENTION

According to the prior art, aerostatic bearing elements are highly suitable for moving and guiding bodies with minimal friction. An aerostatic bearing element is described, for example, in U.S. Pat. No. 7,207,720 in which a body which is porous for gas is arranged at a bearing body and pressurized gas is supplied to the body. A load-carrying gas cushion is formed in the bearing gap between adjacent bearing surfaces. In order to adjust the correct operating point and to specifically influence the characteristics of the aerostatic bearing element, it is necessary, for example, to provide the aerostatic bearing element with preloading. Vacuum preloading, as it is called, in which vacuum-drawing zones are provided within the sliding surface of the aerostatic bearing element, is known from the prior art. For this purpose, the bearing body is provided with bore holes or channels which are then connected to a negative-pressure pump. A state of equilibrium having a positive influence on the mechanical properties of the aerostatic bearing element is formed between the sliding surface of the aerostatic bearing element operating at positive pressure and the preloading unit operating at negative pressure. An aerostatic bearing element disclosed in U.S. Pat. No. 4,749,283 is suitable for a vacuum environment. In this case, the suction stages surrounding the sliding surface or load-carrying zone are provided for the excess gas at the sliding surface so that the gas does not invade the vacuum environment. Further, aerostatic bearing elements are used in gas-guided stages for electron beam lithography as is disclosed, for example, in EP 1 235 115 A2.

Vacuum preloading, mentioned above, for the use of aerostatic bearing elements under normal atmosphere cannot be implemented under vacuum conditions. Therefore, aerostatic bearing elements are frequently preloaded by mass, or opposed arrangements of bearing elements are selected and preloading is carried out by the wrap-around.

SUMMARY OF THE INVENTION

It is the object of the invention to propose a highly preloaded aerostatic bearing arrangement which requires no additional mass and in which the preloading is provided by means of a simple design and, particularly for electron beam lithography, there is no negative influence on the electron beam.

This object is met according to the invention through the characterizing features of the main claim in conjunction with the features of the preamble.

Advantageous further developments and improvements are made possible by the steps indicated in the dependent claims.

An electrostatic preloading unit having at least one electrode is associated with the at least one aerostatic bearing element in such a way that an electrostatic force component is generated in direction of the surface normal of the bearing body in combination with another electrode by applying electrical voltage. In this way, the aerostatic bearing element is preloaded relative to a counterpart, e.g., a base structure, with no additional or slight mass being added, and the operating point of the aerostatic bearing element can be neatly adjusted with the required stiffness.

The at least one electrode is arranged at or in a preloading body which is a component part of the preloading unit, and the electrode can advantageously be deposited as a conductive layer on the preloading body or can be arranged thereon using techniques for mounting and joining. Also, the preloading body itself can be the electrode. The electrode can also be deposited as a layer system of conductive and insulating layers, the dielectric layer serving to insulate the electrode. A dielectric for insulation can also be arranged on the electrode using techniques for mounting and joining.

A high voltage of preferably less than 6000 V is applied to this electrode to generate an electric field strength.

In an advantageous manner, the base structure itself, which can be constructed as a base plate, forms a second electrode which is preferably at ground potential. An electric field is formed between the two electrodes similar to the known principle of the plate capacitor.

In an especially advantageous embodiment form, at least two electrodes which are spatially and electrically separated are arranged at or in the preloading body and can be acted upon by different potentials. The two electrodes making up an electrode pair are advantageously arranged next to one another and are likewise provided with a dielectric layer for insulation. Also, a plurality of electrode pairs can be provided next to one another or offset relative to one another.

The aerostatic bearing arrangement can comprise a plurality of aerostatic bearing elements, a preloading unit being associated with each aerostatic bearing element so as to be arranged directly adjacent to it. An advantageous embodiment form is realized by arranging the preloading unit centrally within a plurality of aerostatic bearing elements, since a compact construction is produced in this way.

A torque-free preloading of the bearing element is realized through a radially symmetrical arrangement of the preloading unit around an aerostatic bearing element.

In a particularly advantageous manner, the aerostatic bearing element or the suction structure itself is part of the preloading unit or the preloading unit is at least partially integrated in the suction area of the bearing body because this minimizes the additional mass.

In an advantageous embodiment form, a controlling and/or regulating unit is provided which controls and/or regulates the electrostatic force component generated for preloading by means of the applied voltage and, in case of preloading units having a plurality of electrodes or in case of a plurality of preloading units, the voltage and, therefore, the electrostatic force component being applied in each instance can be controlled and/or regulated individually. This controlling and/or regulating unit makes it possible to switch or regulate the noncontacting components of force generated by the field strength as appropriate for the given conditions so that optimal matching can be carried out. At the same time, a simple and dynamic compensation of alternating loads can be achieved.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
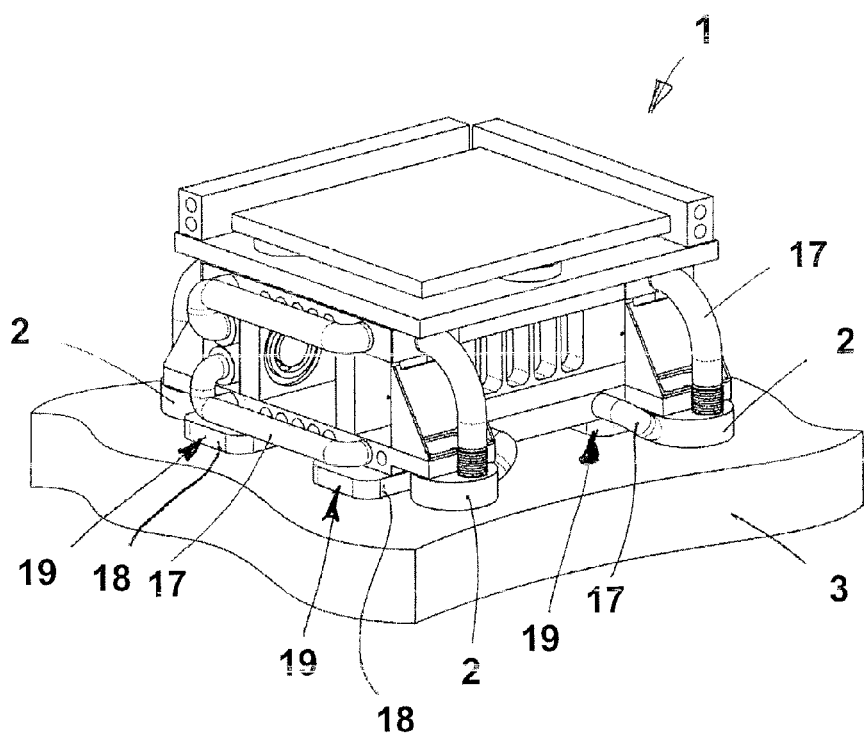
FIG. 1 shows a perspective view of a stage which is movable on a base structure and has the aerostatic bearing arrangement according to the invention in a first embodiment example.
Figure 2:
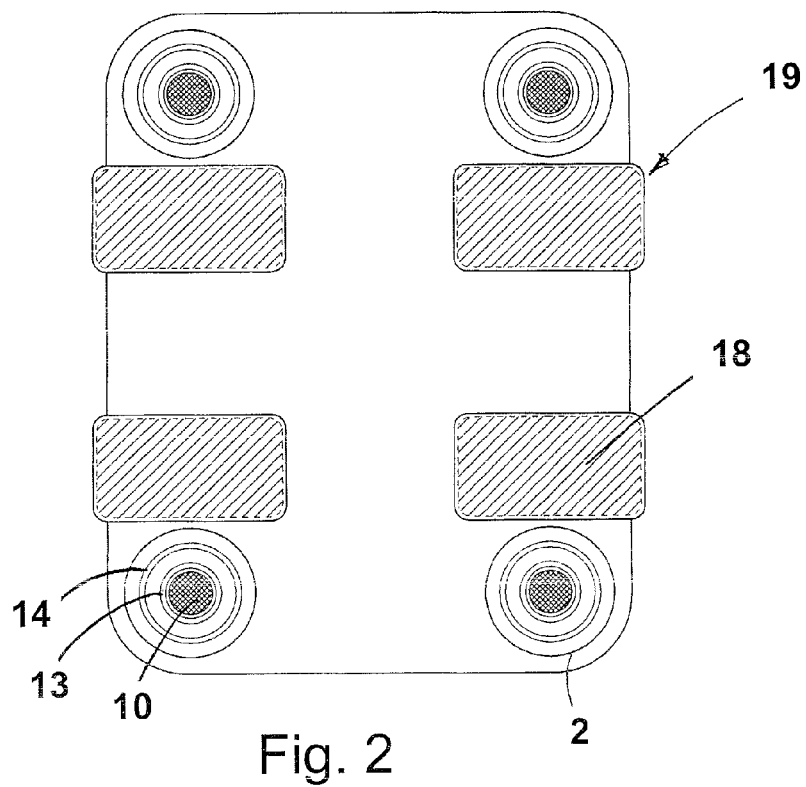
FIG. 2 shows a bottom view of the bearing arrangement according to FIG. 1.

The stage 1 shown in FIGS. 1 and 2 is movable on a base structure, which can be constructed in the present case as a base plate 3, by means of aerostatic bearing elements 2 which are a component part of a bearing arrangement. An aerostatic bearing element will be described referring to FIG. 3 which shows the construction of the bearing element schematically. The bearing element, designated by 4, comprises a bearing body 5 having a load-carrying zone 6 and a suction area 7. The load-carrying zone 6 in which the load-carrying air film or gas film is formed is connected to a gas feed 8 which delivers gas under pressure, this gas flowing in a throttled manner through a distribution system 10, e.g., a porous material or individual nozzles, into a gap 9. A first sealing gap 11 and a second sealing gap 12 are integrated in the aerostatic bearing element 4 in each instance so as to surround the load-carrying zone 6. A first suction channel 13 is arranged between the first sealing gap 11 and load-carrying zone 6, and a second suction channel 14 is arranged between the first sealing gap 11 and second sealing gap 12. The first sealing gap 11 and the suction channel 13 form a first suction stage for a first vacuum, and the second sealing gap 12 and suction channel 14 form a second suction stage for a second vacuum. The excess gas is discharged from the suction channels 13 and 14, e.g., through the connection of the channels to vacuum pumps, which is indicated by arrows 15 and 16.

The aerostatic bearing elements used in FIG. 1 are constructed in the manner described above referring to FIG. 3. The drawing also shows connection pipes 17 for supplying the pressurized gas and extracting excess gas.

The stage and bearing arrangement corresponding to FIGS. 1 and 2 have four preloading units 19 which are arranged next to the bearing elements 2 and which each include a preloading body 18. The preloading unit 19 comprises connections, not shown, for applying a high voltage. In the embodiment example according to FIGS. 1 and 2, a first electrode is formed on each preloading body 18, while the base plate 3 forms the second electrode which is advantageously at ground potential. A high voltage of up to 6000 V is applied to the first electrode by means of the connection of the preloading unit 19. During operation of the stage and aerostatic bearing arrangement, the pressurized gas is supplied via the gas feed 8 (see FIG. 3), and a load-carrying pressure cushion is formed in the load-carrying zone 6. The voltage is applied to the preloading units 19 to generate preloading beyond the mass of the stage itself so that the preloading units 19 or the electrode of the preloading body 18 and the base plate work like a plate capacitor, wherein clearance in the form of a vacuum gap is provided as a dielectric, or a solid state dielectric is additionally provided. Accordingly, the electrostatic field strengths are used for generating a force in direction of the surface normal of the aerostatic bearing elements.

Another embodiment example of the bearing arrangement according to the invention is described with reference to FIG. 3. In this embodiment example, the preloading unit is integrated in the aerostatic bearing element 4 or in the bearing body 5 thereof. It can be seen that a first electrode 21 is arranged at or in the suction area 7 surrounding the load-carrying zone 6, and a dielectric layer 22 is arranged on the first electrode 21 so as to face the sealing gap. In this case, as is also shown, the base plate 3 has a separate electrode 23.

Figure 3:
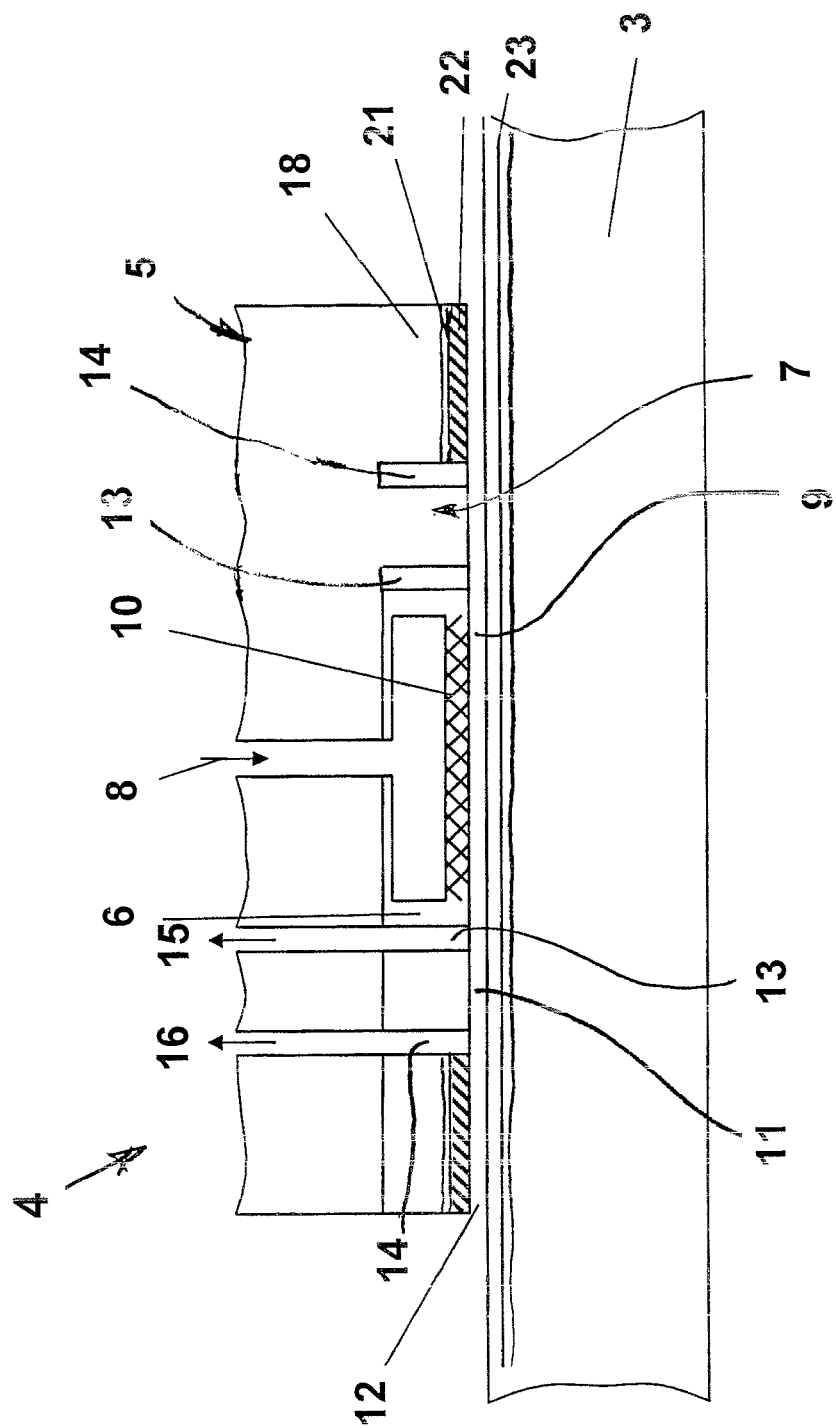
FIG. 3 shows a schematic view in section through a bearing arrangement according to another embodiment example.
Figure 4:
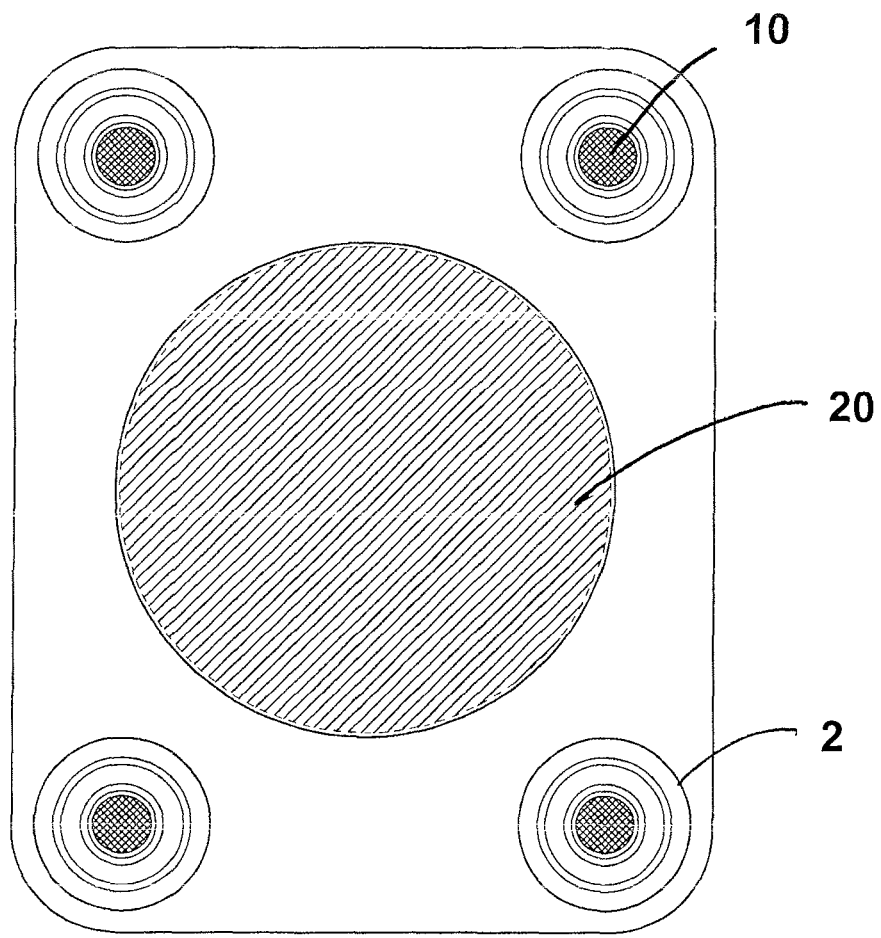
FIG. 4 shows a bottom view of an aerostatic bearing arrangement according to the invention in another embodiment example.

FIG. 4 shows a bottom view of another embodiment example of an aerostatic bearing arrangement according to the invention having a preloading unit 20 arranged in the center and four aerostatic bearing elements 2 surrounding this preloading unit 20. This results in a compact arrangement. In other respects, the function of the bearing arrangement is the same as that described with reference to FIGS. 1 to 3.

Figure 5:
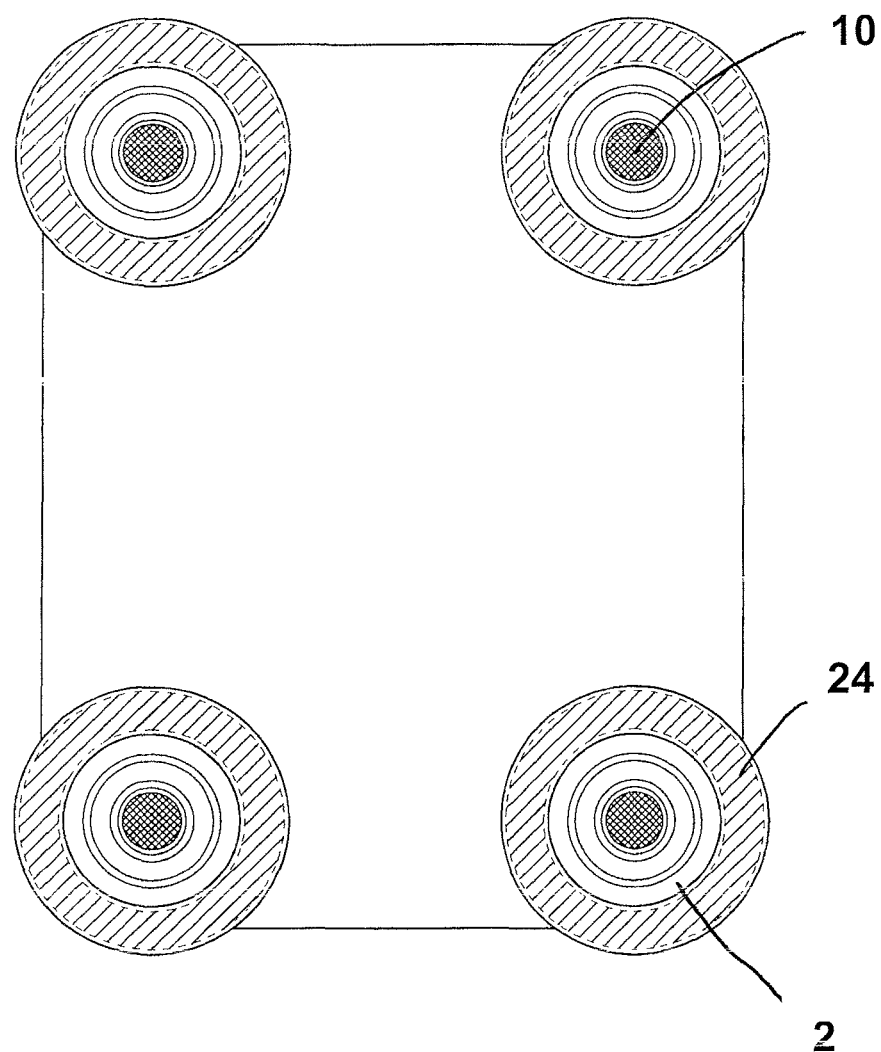
FIGS. 5 and 6 show a bottom view of two other embodiment examples of the bearing arrangement according to the invention.

An arrangement similar to that shown in FIG. 3 is shown in a bottom view in FIG. 5. The preloading units 24 are constructed annularly, each of them surrounding a bearing element 2.

Figure 6:
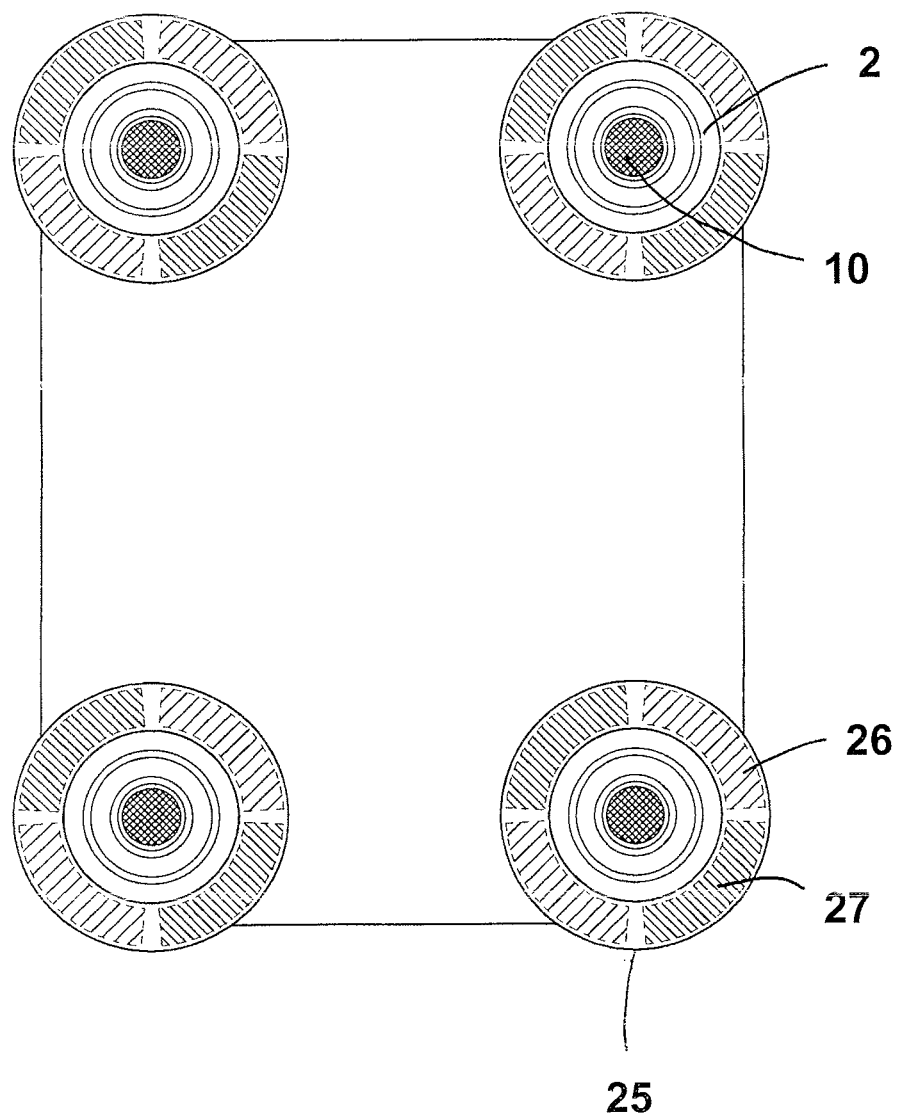

In the embodiment example according to FIG. 6, pairs of two electrodes 26, 27 are arranged in or on an annular preloading body 25 of the preloading units so as to be spatially separated, and voltages are applied to these electrodes 26, 27 in such a way that a positive and/or negative voltage is applied between the electrodes. In this way, field lines are formed, possibly over the base plate 3, which generate a force component in direction of the surface normal of the aerostatic bearing elements.

While this invention has been particularly shown and described with references to preferred embodiments thereof, it will be understood by those skilled in the art that various changes in form and details may be made therein without departing from the scope of the invention encompassed by the appended claims.

What is claimed is:
1. An aerostatic bearing arrangement comprising:
a base plate;
at least one aerostatic bearing element comprising a bearing body having a load-carrying zone, wherein gas supply apertures or porous areas are arranged within the load-carrying zone, and a pressurized gas is fed to the gas supply apertures or the porous areas to form a gas cushion;

an electrostatic preloading unit having at least one first electrode having a planar surface associated with the at least one aerostatic bearing element;

a second electrode having a planar surface arranged at the base plate or formed by the base plate wherein said second electrode is separated from the at least one first electrode by a gap generated by said gas cushion between the base plate and the at least one aerostatic bearing element; and a voltage supply for applying a voltage to said at least one first electrode of the preloading unit so that the at least one first electrode works together with the second electrode to generate an electrostatic force component in a direction normal to a surface of the bearing body of the aerostatic bearing element.

2. The bearing arrangement according to claim 1, wherein the preloading unit comprises a preloading body at which the at least one first electrode is arranged or forms the at least one electrode.

3. The bearing arrangement according to claim 1, wherein at least one dielectric layer is arranged on the at least one first electrode.

4. The bearing arrangement according to claim 1, wherein the one first electrode is arranged at or in the preloading body.

5. The bearing arrangement according to claim 1, wherein the at least one first electrode and at least one additional electrode are spatially and electrically separated and arranged at or in the preloading body and wherein different voltages are applied to the at least one first electrode and the at least one additional electrode.

6. The bearing arrangement according to claim 1, wherein the bearing element is arranged in a center of the preloading unit.

7. The bearing arrangement according claim 1, wherein the preloading unit is arranged directly adjacent to the at least one aerostatic bearing element.

8. The bearing arrangement according to claim 1, wherein a plurality of aerostatic bearing elements surround the preloading unit.

9. The bearing arrangement according to claim 1, further comprising a suction area surrounding the load-carrying zone, wherein the preloading unit is at least partially integrated in the suction area of the bearing body.

10. The bearing arrangement according to claim 1, further comprising a controlling and/or regulating unit controlling and/or regulating the electrostatic force component generated by the preloading unit in response to the applied voltage.

11. The bearing arrangement according to claim 10, further comprising a plurality of preloading units, wherein said applied voltage and said electrostatic force component is individually regulated to each of the plurality of preloading units.

12. An aerostatic bearing arrangement comprising:

at least one aerostatic bearing element comprising a bearing body having a load-carrying zone, wherein gas supply apertures or porous areas are arranged within the load-carrying zone, and a pressurized gas is fed to the gas supply apertures or the porous areas to form a gas cushion;

an electrostatic preloading unit having at least one electrode having a planar surface associated with the at least one aerostatic bearing element, to which at least one electrode a voltage is applied in order to cause the at least one electrode to work together with a base plate to generate an electrostatic force component in a direction to a surface normal of the bearing body of the aerostatic bearing element; and a control unit controlling the electrostatic force component generated by the preloading unit in response to the applied voltage in order to control the gap width of the gas cushion of the aerostatic bearing.

13. The aerostatic bearing arrangement according to claim 12, wherein the control unit regulates the electrostatic force component generated by the preloading unit in response to the applied voltage.

14. The aerostatic bearing arrangement according to claim 12, further comprising a plurality of preloading units, wherein said applied voltage and said electrostatic force component is individually regulated to each of the plurality of preloading units.

15. The aerostatic bearing arrangement according to claim 12, wherein the preloading unit comprises a preloading body at which the at least one electrode is arranged or forms the at least one electrode.

16. The aerostatic bearing arrangement according to claim 12, wherein at least one dielectric layer is arranged on the at least one electrode.

17. The bearing arrangement according to claim 12, wherein at least one first electrode and at least one second electrode are spatially and electrically separated and are arranged at or in the preloading body and wherein different voltages are applied to the at least one first electrode and the at least one second electrode.

* * * * *